US 8,275,233 B2

(12) United States Patent
Henry et al.

(10) Patent No.: US 8,275,233 B2
(45) Date of Patent: Sep. 25, 2012

(54) SYSTEM AND METHOD FOR AN EARLY START OF AUDIO-VIDEO RENDERING

(75) Inventors: Jean-Baptiste Henry, Melesse (FR); Alexandre Herisse, Poitiers (FR)

(73) Assignee: Thomson Licensing, Issy les Moulineaux (FR)

( * ) Notice: Subject to any disclaimer, the term of this patent is extended or adjusted under 35 U.S.C. 154(b) by 253 days.

(21) Appl. No.: 12/734,124

(22) PCT Filed: Oct. 8, 2008

(86) PCT No.: PCT/EP2008/063487
§ 371 (c)(1),
(2), (4) Date: Aug. 26, 2010

(87) PCT Pub. No.: WO2009/047273
PCT Pub. Date: Apr. 16, 2009

(65) Prior Publication Data
US 2010/0329630 A1 Dec. 30, 2010

(30) Foreign Application Priority Data
Oct. 11, 2007 (EP) .................................. 07301453

(51) Int. Cl.
*H04N 5/932* (2006.01)
*H04N 9/88* (2006.01)
(52) U.S. Cl. ........................................ 386/201; 386/263
(58) Field of Classification Search .................. 386/201, 386/207, 202, 217, 248, 263, 264, 318
See application file for complete search history.

(56) References Cited

U.S. PATENT DOCUMENTS

| | | | |
|---|---|---|---|
| 5,583,652 A * | 12/1996 | Ware | 386/206 |
| 6,247,072 B1 | 6/2001 | Firestone | |
| 6,665,751 B1 | 12/2003 | Chen et al. | |
| 2007/0006063 A1 * | 1/2007 | Jewsbury et al. | 715/500.1 |

FOREIGN PATENT DOCUMENTS
WO    WO 2004/062291    7/2004

OTHER PUBLICATIONS

E. Steinbach: "Adaptive Abspieltechniken Fuer Internet-Mediastreaming", FKT Fernseh and Kinotechnik, Fachverlag Schiele & Schon GmbH, Berlin, DE, vol. 57, No. 1/02, Jan. 1, 2003, pp. 22-25. E. Steinbach et al: "Adaptive playout for low latency video streaming" Proceedings 2001 International Conference on Image Processing. ICIP 2001, Greece, Oct. 7-10, 2001,IEEE, vol. 1, Oct. 7, 2001, pp. 962-965.
B. Girod et al: "Advances in channel-adaptive video streaming" Proceedings 2002 International Conference on Image Processing. ICIP 2002, New York, Sep. 22-25, 2002; IEEE, vol. 1, Sep. 22, 2002, pp. 9-12.
Search Report Dated Nov. 27, 2008.

* cited by examiner

*Primary Examiner* — Robert Chevalier
(74) *Attorney, Agent, or Firm* — Robert D. Shedd; Jeffrey M. Navon

(57) ABSTRACT

The present invention relates to a method at a receiver for playing a stream comprising a set of video samples and a set of audio samples, said audio samples and said video samples being adapted to be rendered at a standard rendering speed in a synchronized manner, comprising at the receiver the steps of starting the reception of the stream, starting the rendering of the video samples at a speed slower than the standard rendering speed and accelerating the rendering speed up to the standard rendering speed. The invention also concerns methods for an early rendering of audio samples, when the stream comprises a set of audio samples, wherein the audio and video samples are adapted to be rendered at a standard rendering speed in a synchronized manner.

7 Claims, 9 Drawing Sheets

SYSTEM AND METHOD FOR AN EARLY START OF AUDIO-VIDEO RENDERING

This application claims the benefit, under 35 U.S.C. §365 of International Application PCT/EP2008/063487, filed Oct. 8, 2008, which was published in accordance with PCT Article 21(2) on Apr. 16, 2009 in English and which claims the benefit of European patent application No. 07301453.2, filed Oct. 11, 2007.

The present invention relates generally to audio-video rendering and in particular to a method for an early start of audio-video rendering.

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Changes in Television broadcast technologies have lead to a longer zapping time. With analogical broadcast television, zapping was immediate. With digital television, zapping requires more time. This is illustrated as follows. Video distribution through broadband networks uses standard compression systems such as MPEG-2 or JVT/H.2641 MPEG AVC. MPEG standards define the group of pictures (GoP). The GoP defines successive pictures sequence I, P, B. These pictures are defined in MPEG standards. The I picture is encoded without any reference to the other pictures. The P picture refers to the previous I or P pictures. The B picture refers to the previous and following I or P pictures. When a receiver receives a new program, it waits for the reception of an I picture to start decoding the program. A delay appears between the reception of the stream and the rendering of the stream on a video screen.

Mechanisms used to reduce the digital television bandwidth use less and less I pictures. The decoder requires then more time to find and decode the I picture. This can take up to half a second. Moreover, with television transport over the Internet Protocol networks, an additional buffer is needed at the decoder to compensate the network delivery unreliability. This increases the time between the reception of the program and the transmission of the television stream to the decoder. It can require more than two seconds between the reception and the rendering of the new program picture on the screen.

Some technologies have appeared to decrease this zapping time. WO2005112465A1 describes additional streams that are quickly decoded for zapping, such as rapid I picture finding. EP1523190 patent application describes a unicast burst push method to fill the decoder. These methods require sending an additional stream to the decoders specifically for the zapping process.

The present invention concerns a method for an early start of audio-video rendering. It provides a simple method at an audio-video receiver without any impact at the audio-video sender.

To this end the invention concerns a method at a receiver for playing a stream, the stream comprising a set of discrete samples adapted to be rendered at a standard rendering speed, comprising at the receiver the steps of starting the reception of the stream, starting the rendering of the discrete samples at a speed slower than the standard rendering speed and accelerating the rendering speed up to the standard rendering speed.

The stream is received from another device. The receiver starts the reception of the stream.

Instead of starting the rendering of the discrete samples at the standard rendering speed, the receiver of the invention starts the rendering at a lower speed. This is a slow start rendering. And the rendering speed is slowly and continuously increased to the standard rendering speed. This permits to render the discrete samples earlier.

According to an embodiment of the invention, the stream comprises a set of continuous samples, the continuous and discrete samples being adapted to be rendered at a standard rendering speed in a synchronized manner, and the method further comprises the step of rendering the continuous samples at the standard rendering speed and not synchronized with the discrete samples when the discrete samples are rendered at a speed lower than the normal speed and rendering the continuous samples at the standard rendering speed and synchronized with the discrete samples when the discrete samples are rendered at the standard rendering speed.

Rendering the continuous samples with the slow start method would conduct to an inconvenient rendering to the end user. Waiting for the time when the synchronized continuous samples rendering would be acceptable to the end user might be long to the end user. The continuous samples rendering of the invention is desynchronized from the discrete samples rendering. The method permits to provide early continuous samples rendering that is acceptable to the end user.

According to an embodiment of the invention, the step of rendering the continuous samples synchronized with the discrete samples starts with the discrete sample rendering being adjusted to the continuous sample rendering.

The synchronization start is then transparent to the end user.

According to an embodiment of the invention, the step of rendering the continuous samples not synchronized with the discrete samples starts at a time corresponding to the time when the discrete sample would be rendered at the standard rendering speed.

According to a variant embodiment of the invention, the stream comprises a set of continuous samples, the continuous and discrete samples being adapted to be rendered at a standard rendering speed in a synchronized manner, and the method further comprises the steps of, when the discrete samples are rendered at a speed lower than the normal speed, and when the continuous samples rendering speed reaches a threshold, rendering the continuous samples synchronized with the discrete samples and at a speed lower than the normal speed, wherein the speed is continuously accelerated up to the standard rendering speed.

It may be possible to render continuous samples at a speed lower than the standard rendering speed, where the rendering is acceptable to an end user. The method permits to start the rendering earlier, synchronized to the discrete samples rendering, as soon as the continuous samples rendering speed is convenient.

According to an embodiment of the invention, prior to the step of receiving a stream, the method comprises the step of zapping to a new program.

The method of the invention permits to reduce the zapping time.

According to an embodiment of the invention, the discrete sample is a video sample and the continuous sample is an audio sample.

According to an embodiment of the invention, the stream is an MPEG-2 stream.

According to an embodiment of the invention, the discrete samples rendering time depends on the delay between the reception of continuous and discrete samples of a same rendering time.

Increasing the discrete samples rendering time permits to enable synchronization with the continuous samples rendering, when the delay between the reception of continuous and discrete samples corresponding to a same rendering time is too high.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The invention will be better understood and illustrated by means of the following embodiment and execution examples, in no way limitative, with reference to the appended figures on which:

Figure 1:
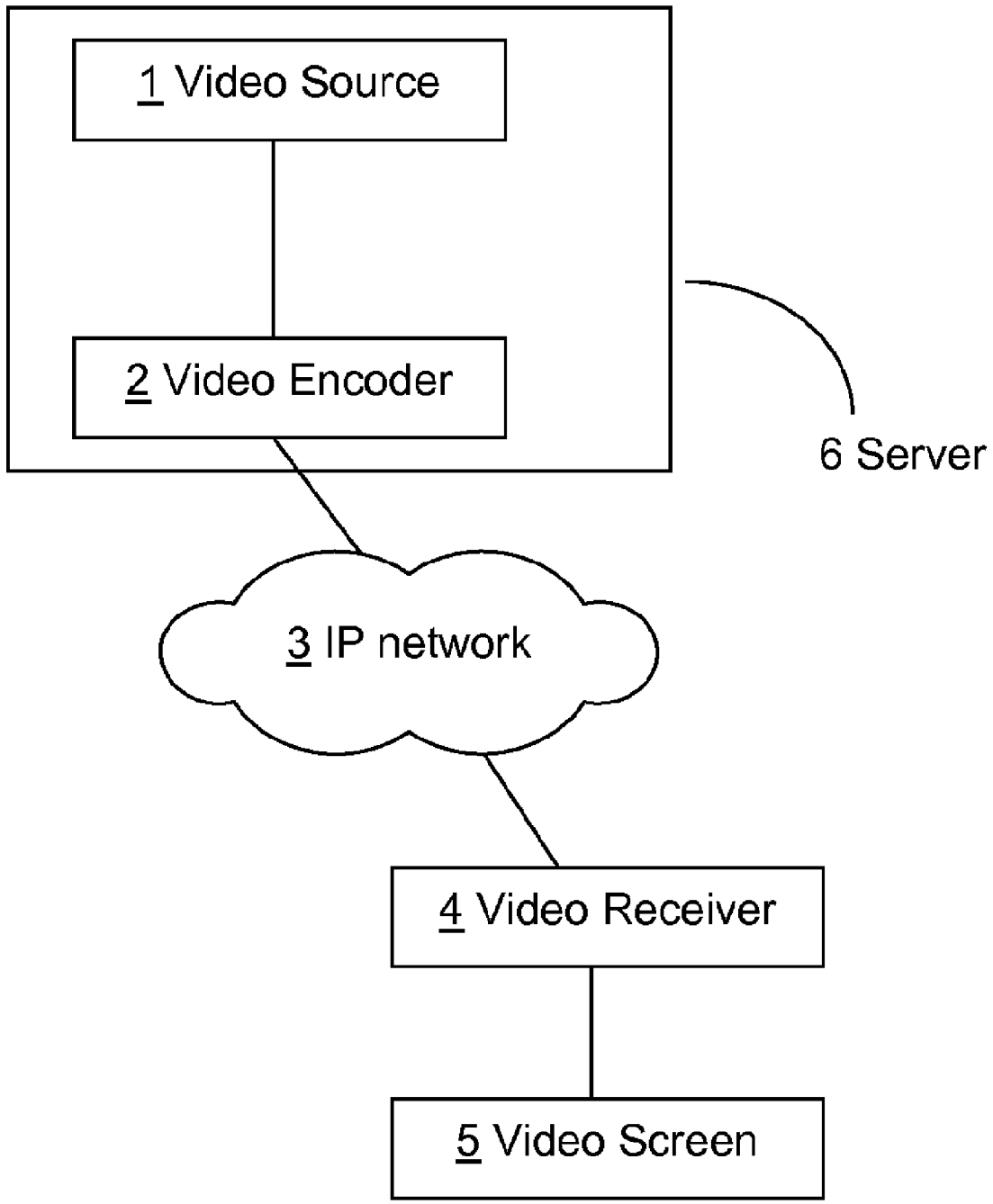
FIG. 1 is a block diagram of a system compliant with the embodiments.
Figure 2:
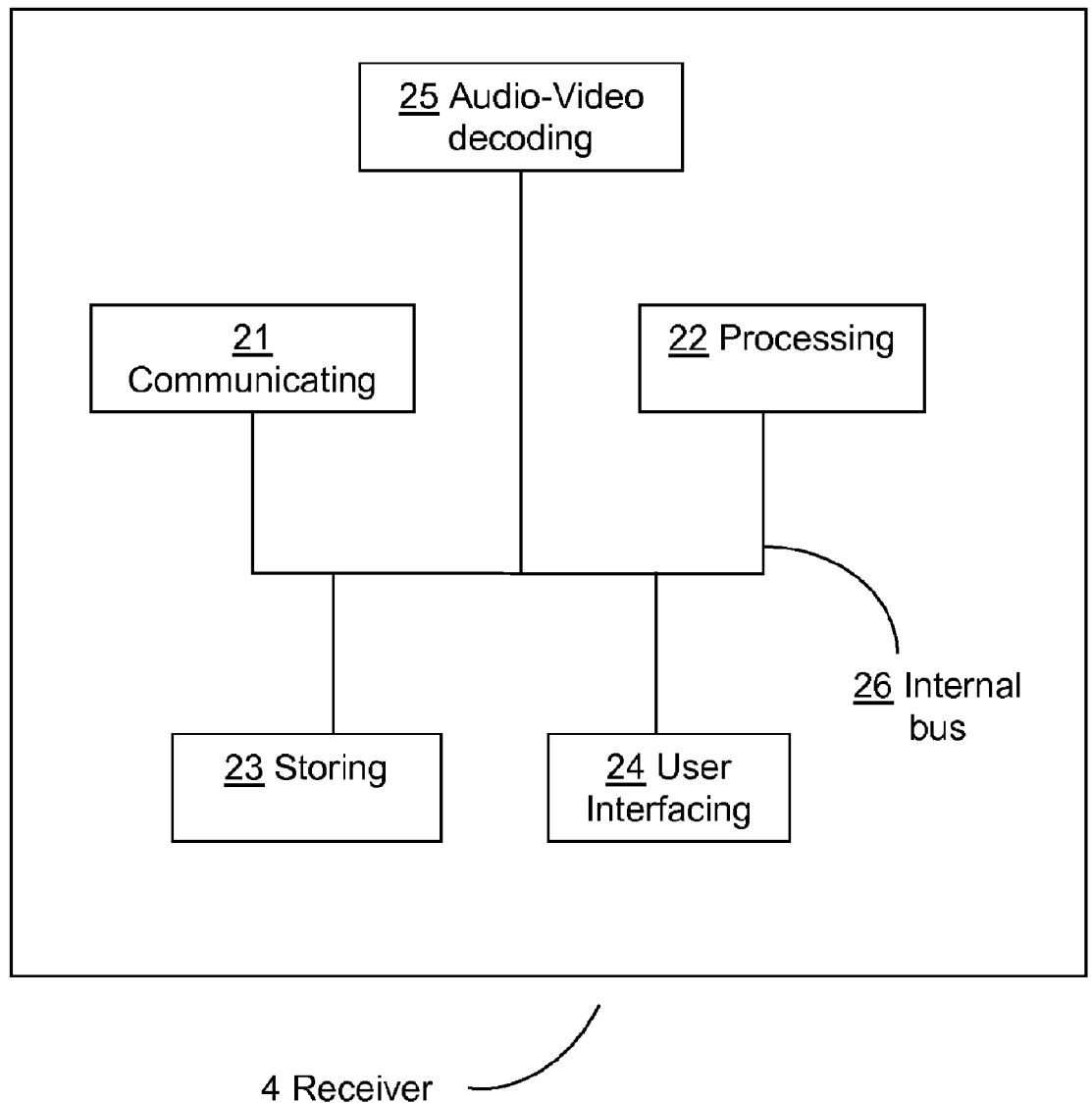
FIG. 2 is a block diagram of a receiver according to the embodiments.

In FIGS. 1 and 2, the represented blocks are purely functional entities, which do not necessarily correspond to physically separate entities. Namely, they could be developed in the form of software, or be implemented in one or several integrated circuits or a combination of both.

The system according to the embodiment is represented in FIG. 1. It comprises devices such as a server 6, a receiver 4, and a video screen 5. The server comprises a video source module 1 and a video encoder module 2. Of course the video source module and a video encoder module might be comprised in separate devices. The server encodes the audio-video stream and sends the audio-video stream to the receiver through the Internet Protocol network 3. Of course the audio-video stream might be transmitted through any network type enabling sending audio-video streams from a server to a receiver. In particular the network might be a local area network. The various components of the audio-video might also be transmitted through a plurality of different networks; wherein the components would then have a way to synchronize themselves at the receiver. The video receiver is a set-top box. Of course it might be any device comprising functions such as the ones comprised in the set-top box for the video decoding. The video stream is received by the set-top box, decoded and rendered at the video screen.

A receiver according to the embodiments is illustrated in the FIG. 2. The receiver comprises communicating module 21 for receiving audio video data from a server on the network. It comprises a storing module 23 for storing audio data and video data. It comprises audio video decoding module 25 for decoding the audio streams and the video streams. It comprises user interface 24 for allowing a user to control the receiver. The user interface permits to activate or deactivate the zapping methods. The various embodiments describes hereinafter might be all implemented in a same receiver, and the user interface permits to select one of the methods for zapping. A processing module 22 is adapted to execute the methods according to the embodiments. Data circulates in the device through an internal bus 26.

Figure 3:
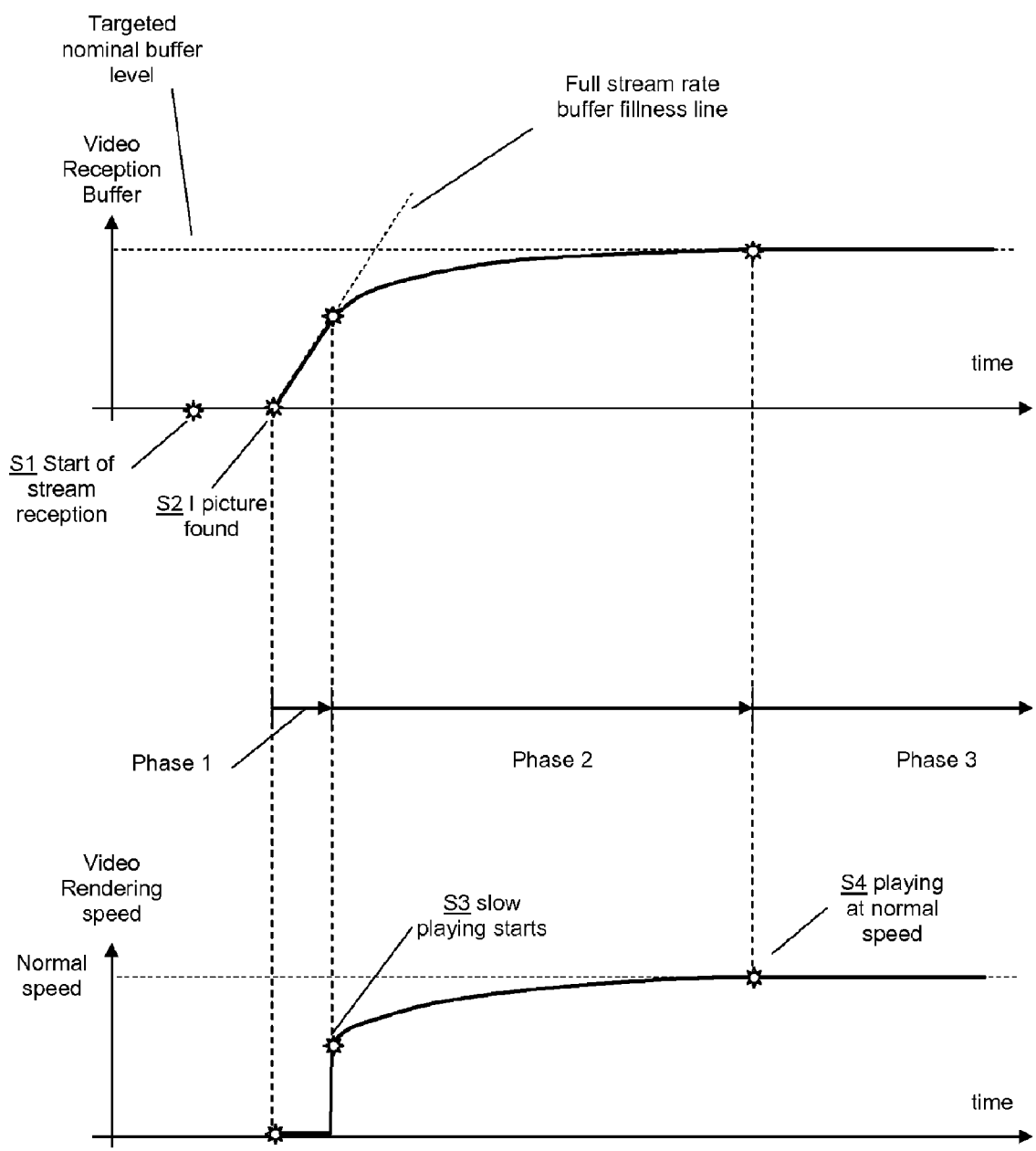
FIG. 3 illustrates the slow start video rendering process according to the embodiment.

The slow start video rendering process according to the embodiment is illustrated in FIG. 3. It comprises the reception buffer filling level diagram and the video rendering speed diagram in function of the time. The stream is transported at a standard speed. It allows the receiver to render the stream at a standard speed. At step S1, the stream is received at the receiver. No image is stored nor rendered. At step S2 an I picture is found in the stream. The phase 1 start, wherein the I picture is displayed on the screen. The receiver then starts filling in the reception buffer. The buffer fills at the rate of the reception since only the received I picture is rendered and no other image is consumed. At step S3 the reception buffer reaches a level where the rendering starts. The level corresponds to an amount of data received that permits to suitably render the video. That level value might be modifiable so that the rendering may be started more or less early. If very early, the rendering is a succession of still pictures. It less early the rendering looks like a slow motion video. At this step, rendering is performed at a speed slower than the standard rendering speed. This is the beginning of the phase 2. The buffer is still filled at receiving speed, but emptied at a speed slower than the standard speed that corresponds to the rendering speed. That emptying speed accelerates slowly to enable rendering at the standard speed. Consequently, the buffer level still fills up but slower and slower as the rendering speed approaches the standard speed. The rendering speed then accelerates up to the time when the reception buffer is full at step S4. This corresponds to the phase 3 where the video is rendered at standard speed.

The emptying speed accelerates as follows. The video buffer is filled at N %. The speed is then set to the value $100/(1+(100-N)*coeff/100)$. The coeff value is by default set to 1. For example, if the video buffer is filled at 60%, the speed is 71.4% of the standard speed.

The coeff value may be set to any value other than 1. A coeff value lower than 1 enables to quickly have an acceptable rendering speed, but requires longer time to fill the buffer and so to reach the standard speed. A coeff value higher than 1 enables to quickly fill the buffer, but the rendering speed is lower at the beginning. The coeff value might also be dynamically modified according to the buffer size.

As the buffer filling increases, the speed then also increases to reach the standard speed.

The slow start rendering process is convenient for video, which is a succession of still pictures, also called discrete samples. A discrete sample of content, when displayed during a period of time, represents the same content during the whole period of time. A discrete sample is rendered totally once during a specific amount of time. A video is a succession of discrete samples, i.e. still pictures, rendered more or less quickly. Typically in MPEG-2, a video displays at a frequency of a picture every 40 ms for a Phase Alternating Line encoding system (PAL), which means 25 pictures per second. This is acceptable for the end user if the frequency is higher than 40 ms.

The slow start rendering process may not be acceptable for continuous samples such as an audio stream. A continuous sample of content, when displayed during a period of time, continuously represents the whole content during the period of time. A continuous sample is gradually represented during a period of time. Typically in MPEG-1 layer II or layer III, an audio stream is encoded into fixed size samples, for example a sample every 24 ms, which corresponds to 48 kHz sampling. Rendering this sample at a rate lower or higher than normal rate typically modifies the pitch of the sound. The modification is already noticeable when the rendering speed is increased or decreased by 5%.

Figure 4:
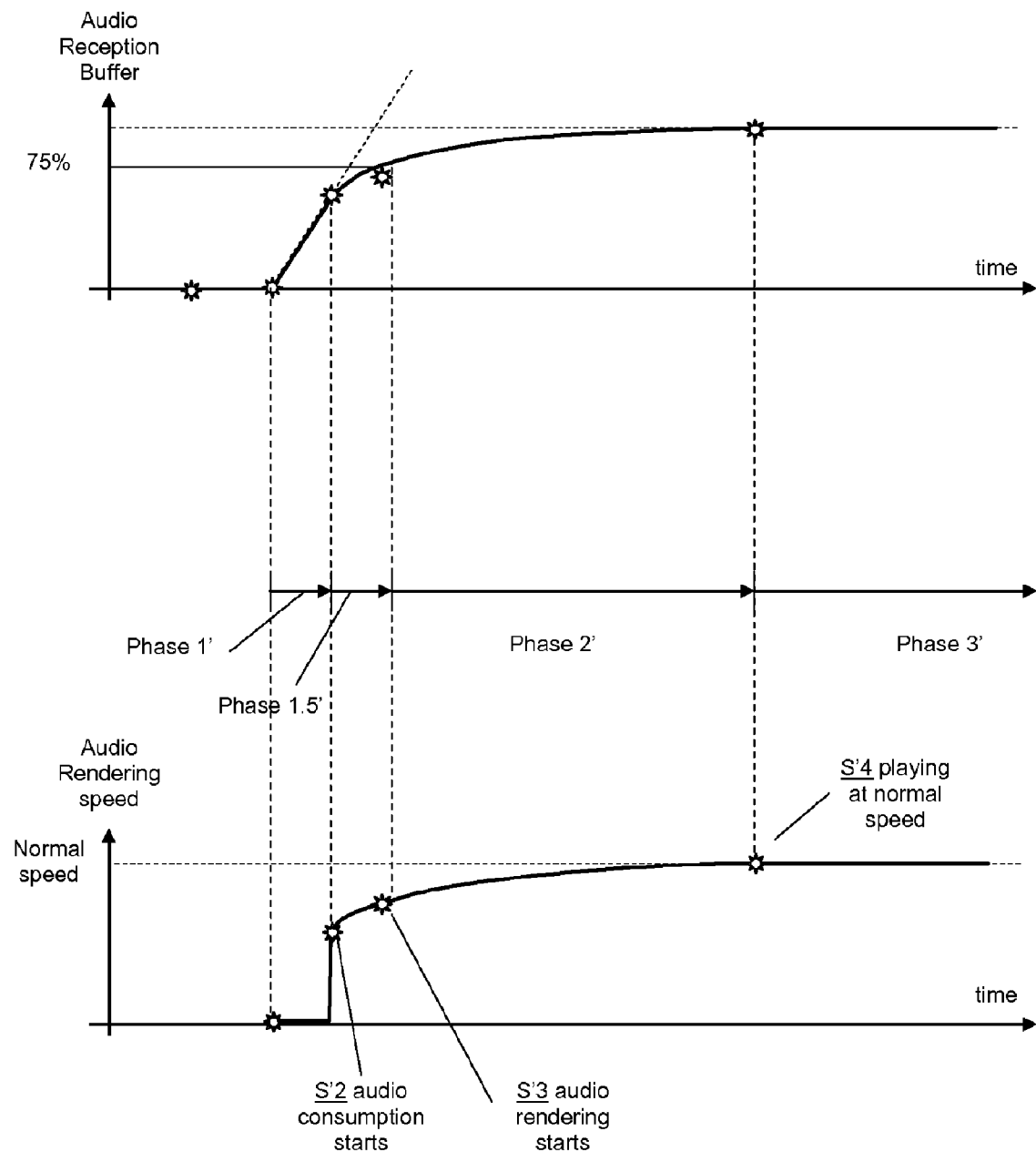
FIG. 4 illustrates the slow start audio rendering process according to a first embodiment.

A first embodiment of an early audio rendering uses a slow start mechanism, as illustrated in FIG. 4. The FIG. 4 comprises an audio reception buffer diagram and an audio rendering speed diagram according to the time. The audio rendering speed diagram matches to the video rendering speed diagram as indicated in FIG. 3. In the first embodiment, the audio is rendered synchronized to the video rendered in a slow start manner.

The receiver uses an algorithm that allows modifying the sample duration while reprocessing the sample so as not to change the pitch. Such algorithms are well known to the skilled person in the art. With such algorithm, called hereinafter pitch algorithm, it is possible to increase or decrease the rendering speed by 25% without strong noticeable effect for the end user. Therefore, the receiver may transparently render the audio when the reception buffer is 75% full. Or course the threshold may be higher or lower than 75%; it may depend on the type of sound that is processed and on the algorithm itself.

The receiver receives the audio at the same time as the video. The audio is stored in the audio reception buffer, this is the phase 1', which corresponds to the phase 1 of FIG. 3. When the video rendering starts at S'2 (corresponding to S3 in FIG. 3), audio samples are consumed in a synchronized manner but are not rendered. This is phase 1.5'. When the audio rendering speed reaches 75%, the audio rendering start, at step S'3, in phase 2'. The audio is synchronized to the video rendering. During the phases 1.5' and 2' the audio reception buffer is slowly entirely filled. When the audio reception buffer is full, the phase 3' starts, at step S'4. The audio and video are rendered at standard speed. Phase 3' matches the phase 3 of FIG. 3.

Some implementations cannot provide such pitch algorithms to process the audio for rendering at low speed. With those implementations, only a standard speed can be used for the audio. With the previous method, the audio would be rendered only at the end of phase 2, when entering the phase 3, which may be quite long.

Figure 5:
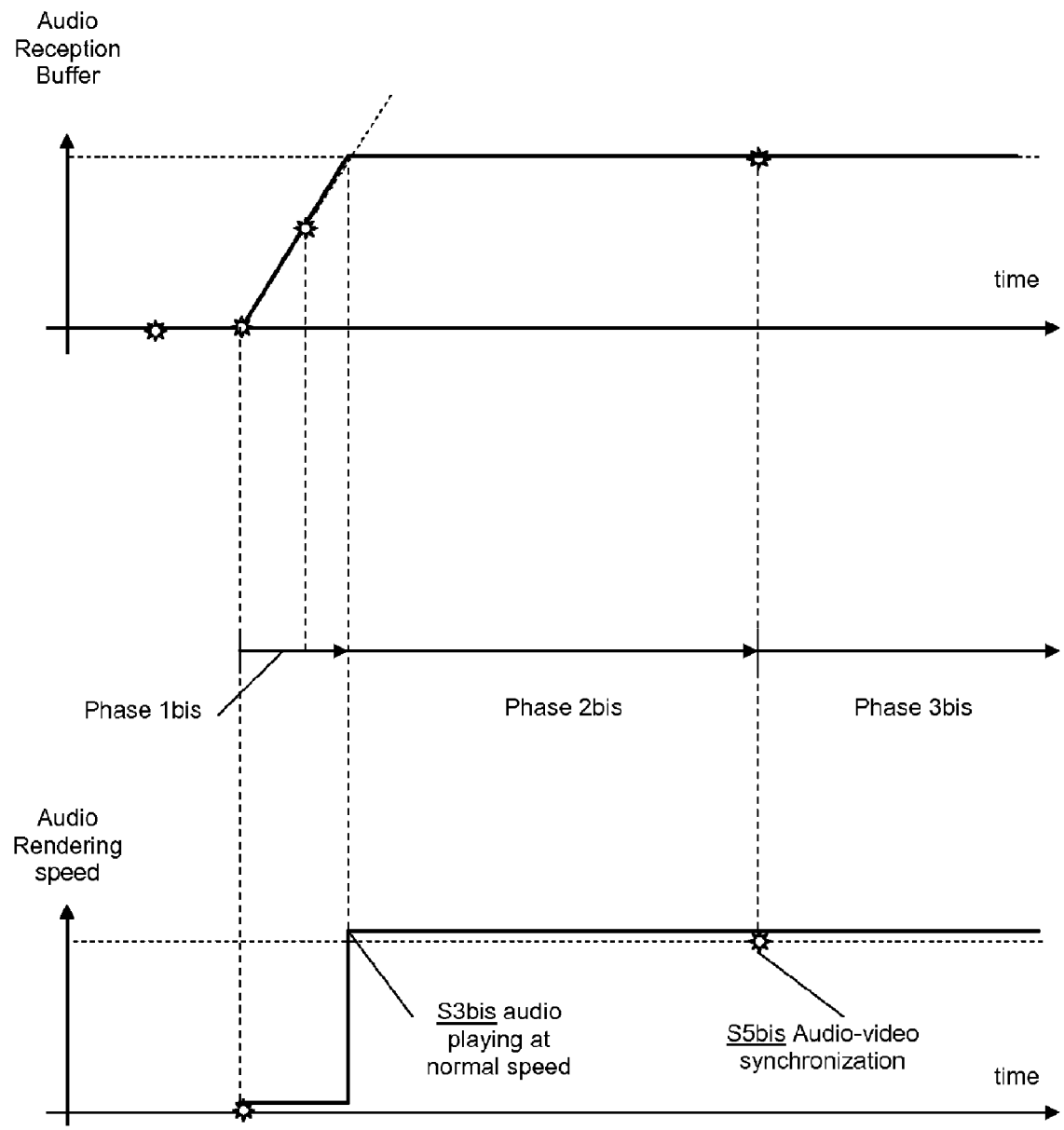
FIG. 5 illustrates the slow start audio rendering process according to a second embodiment.

The early audio rendering according to the second embodiment is illustrated in FIG. 5. This is a desynchronized method where the receiver does not comprise any pitch algorithm. The FIG. 5 comprises an audio reception buffer diagram and an audio rendering speed diagram according to the time. The audio rendering speed diagram matches the video rendering speed diagram indicated in FIG. 3. In particular the start of phase 1 matches the start of phase 1bis and the phase 3 matches the phase 3bis. According to the embodiment, the receiver receives the audio stream and fills in the audio reception buffer. When the buffer is full, at the end of phase 1bis, it renders the audio at standard speed, step S3bis and phase 2bis. The audio rendering is therefore not synchronized with the video rendering during phase 2bis. Audio is rendered later than the start of slow speed video rendering. It is synchronized to the video when the video is rendered at standard speed, at step S5bis.

Figure 6:
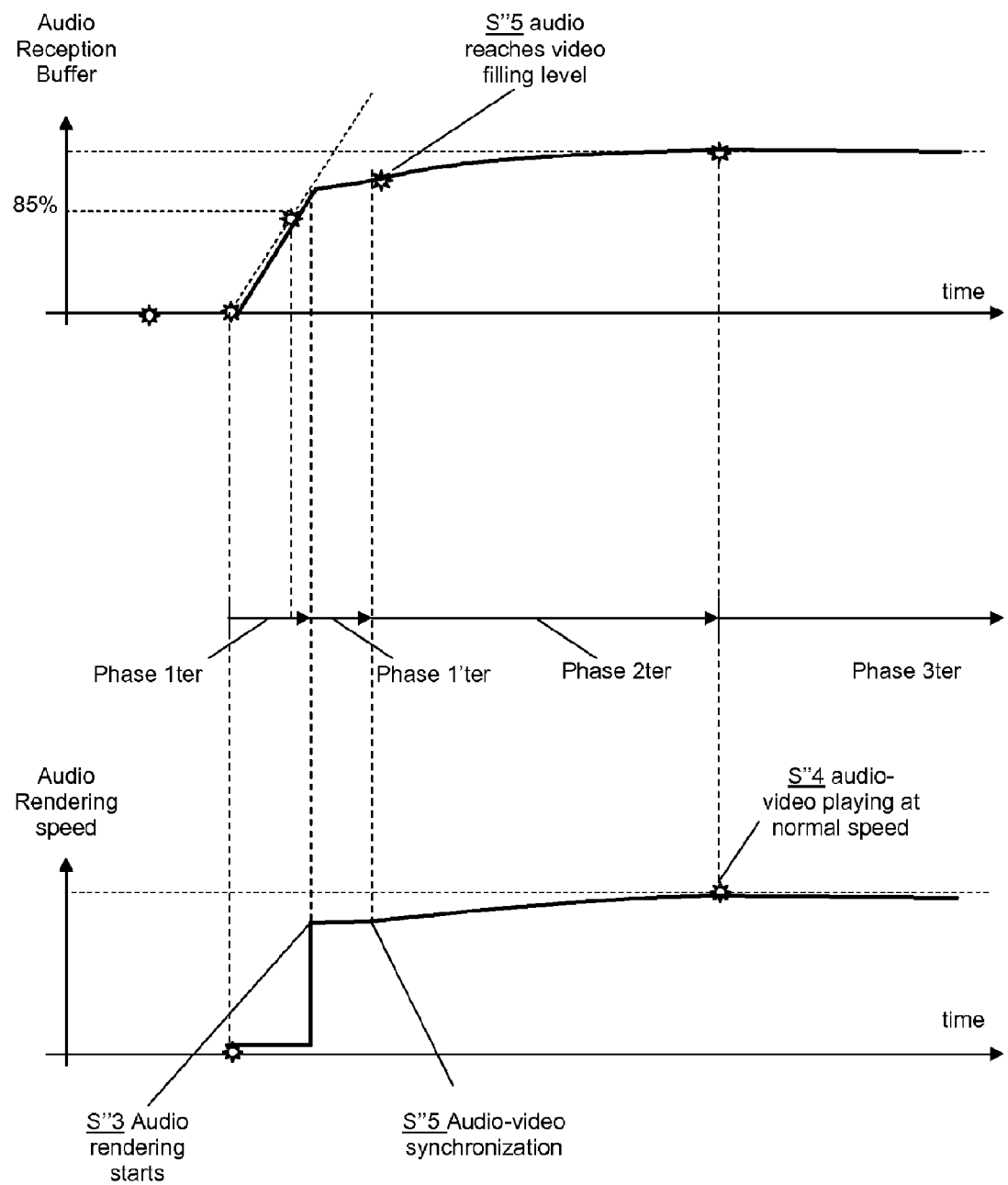
FIG. 6 illustrates the slow start audio rendering process according to a third embodiment.

According to a third embodiment, the method using a pitch algorithm is combined to the desynchronized method, as illustrated in FIG. 6. The receiver comprises means for running a pitch algorithm. At the phase 1ter, the receiver receives the audio and fills in the audio reception buffer at the same speed as the video buffer. When video rendering starts, audio rendering does not start; the audio threshold has not been reached and rendering the audio would be unacceptable for the end user. When the audio buffer reaches a threshold, the pitch algorithm permits to render the audio at a reduced speed, here 85%, at step S"3. This is the start of the phase 1'ter. The audio is not synchronized to the video rendering.

The audio buffer filling level is higher than the video buffer filling level. As soon as the audio buffer filling level reaches the video buffer filling level, the audio is synchronized to the video, step S"5. This is the start of the phase 2ter. The synchronized audio-video rendering speed then slowly increases to reach the standard speed as indicated in the first embodiment, step S"4 and phase 3ter.

When the audio and the video do not match exactly at the time where they should be synchronized (for example at the end of phase 2 with the desynchronized method), it is easier to adjust the video component to the audio component rather than the audio component to the video component. The video picture that is rendered at that time is then rendered more or less time than its original duration so that it catches up with the corresponding audio samples. Adjusting the audio component is not as easy as adjusting the video component, and for system without pitch algorithm, this would result in a sound impact for the end-user, small silence or scratch.

Figure 7:
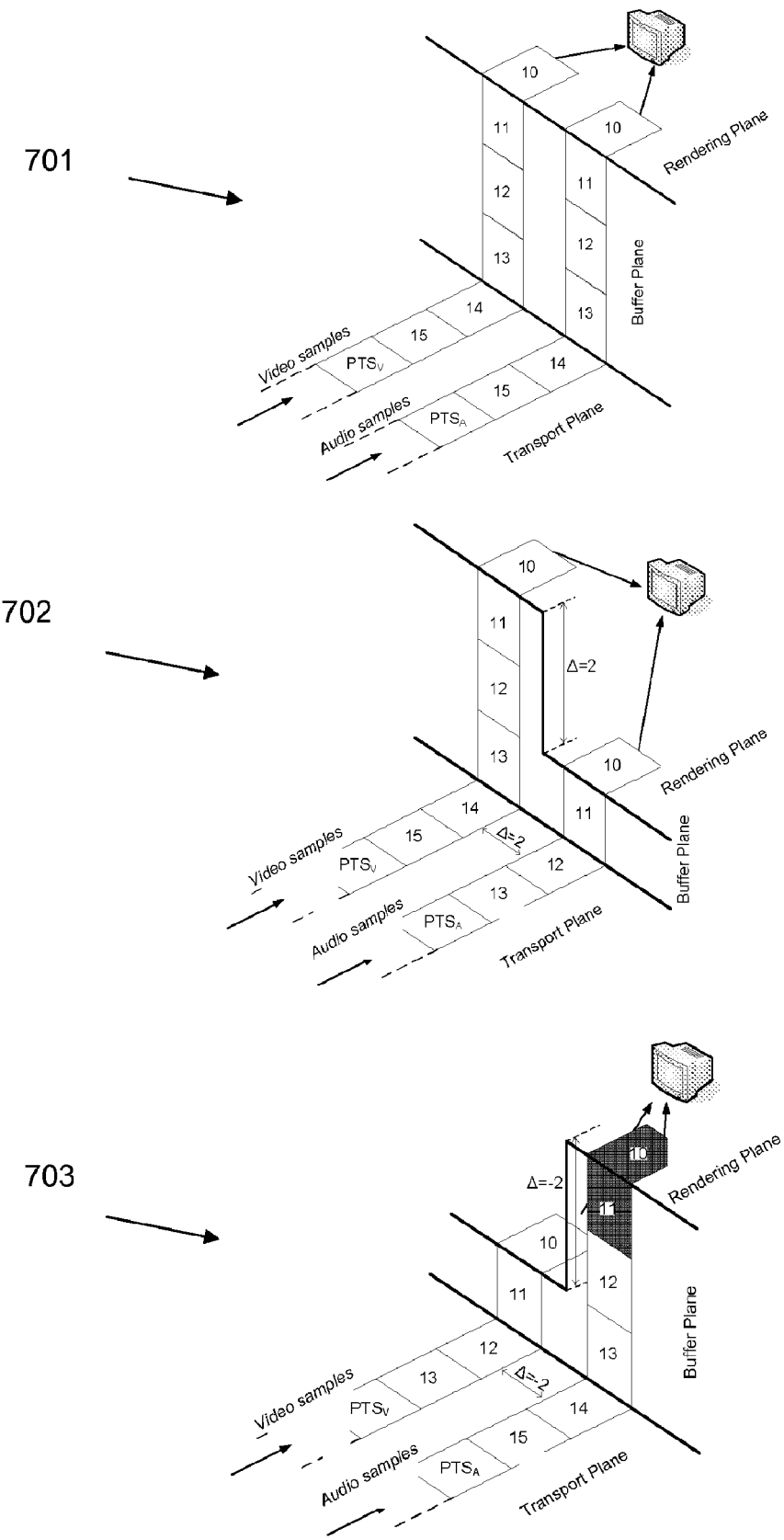
FIG. 7 illustrates the reception of audio video streams.

Audio and video buffering sizes depend on the reception time of audio and video samples. They may be received simultaneously or at different times, as illustrated in FIG. 7. The PTS is the presentation time stamp compliant with an MPEG-2 transport stream. The transport plane illustrates the value of the PTS in the packet that are received, and shows the difference of the reception time of the PTS. In the figures, for illustrative purpose, the PTS are representing samples that are equivalent in duration, which technically is not true for MPEG systems. The buffering plane indicates the minimum reception buffer size required depending on the difference of the reception time. The rendering plane indicates when the audio and video are rendered in a synchronized manner.

When received at the same time, both audio and video samples have the same PTS when they are received. Audio and video buffers are filled simultaneously. Consequently the audio and video buffers have the same size in time unit.

When audio and video components are not synchronized at the transport level, they are not received at the same time. In 702 video is received before audio, with a difference of 2 PTS, represented with Δ value set to 2. In 703 video is received after audio, with a difference of 2 PTS, represented with Δ value set to −2.

Buffer adjustment is then necessary at the receiver. In 702 the video buffer size in the buffer plane is 2 PTS larger in time. In 703 the audio buffer size in the buffer plane is 2 PTS larger in time. The audio and video are then rendered at the same PTS in the rendering plane.

With the desynchronized method, it is however possible to have an audio rendering very early in the zapping phase.

Figure 8:
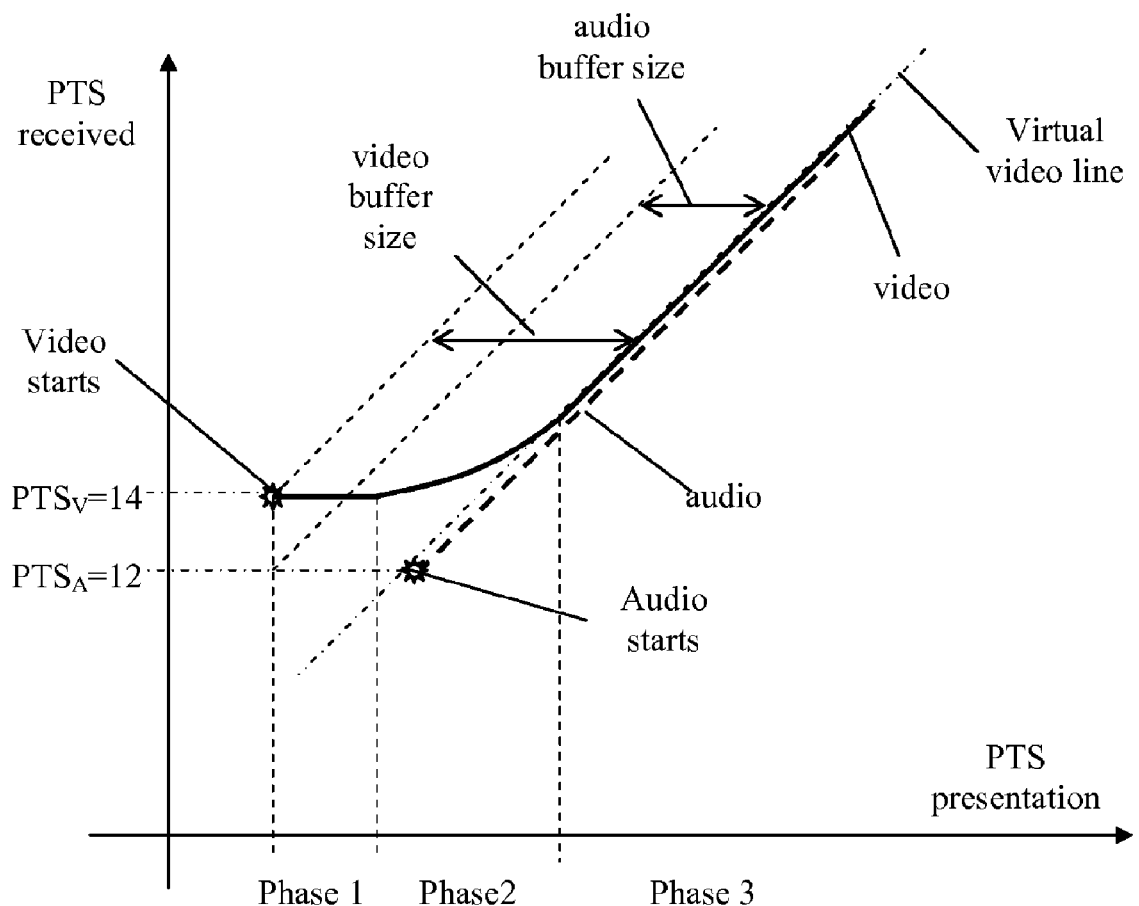
FIG. 8 illustrates the audio and video presentation according to the audio and video reception.
Figure 9:
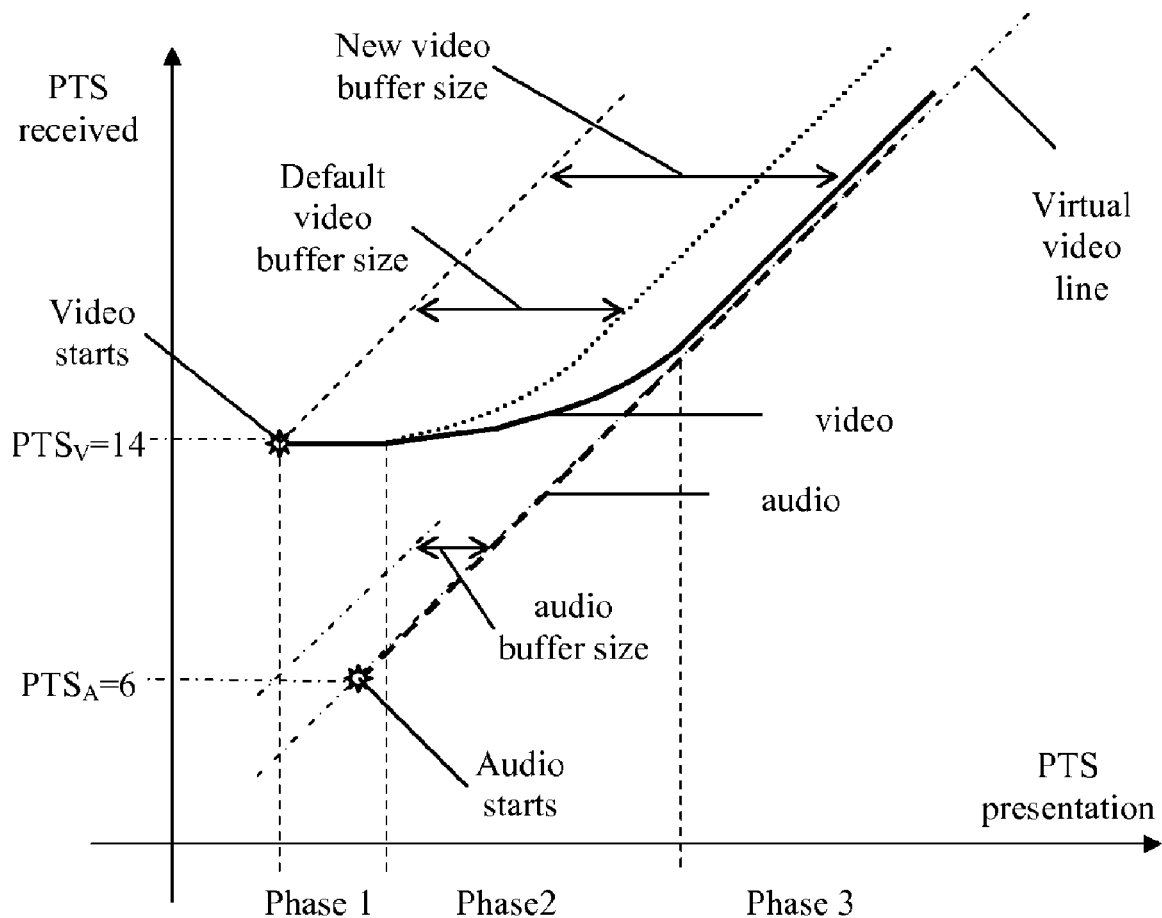
FIG. 9 also illustrates the audio and video presentation according to the audio and video reception.

FIGS. 8 and 9 illustrate the audio and video presentation according to the audio and video reception, when audio and video are not received at the same time. As illustrated in FIG. 8, the audio component is received late compared to the video component. It is not necessary to increase the video buffer size; the video buffer size is sufficiently large to allow synchronization after phase 2. The desynchronized audio starts when it reaches the virtual video line, which is defined hereinafter.

As illustrated in FIG. 9, when the audio component is received very late compared to the video component at the transport level, video buffering size is increased to a new video buffer size. This is necessary because the default video buffer size is not sufficient to enable synchronization to the audio after phase 2. The virtual video line is calculated according to the new video buffer size. The desynchronized audio starts when it reaches the virtual video line.

The point in time when to render the desynchronized audio is determined by the meeting point with a virtual video line. This virtual video line is calculated with the final video buffer size and by extrapolating the video PTS that would be rendered if the video was rendered at standard speed without zapping. With an accurate computation, audio and video are synchronized at the end of phase 2. In order to compute the final video buffer size, the video component bit rate is required, because the final video buffer size is expressed in time unit.

The virtual video line is calculated taking into account the minimum video buffer size, the PTS difference at reception between the audio and the video and the video bitrate. The reception bit rate is continuously calculated with the packets reception flow. The minimum video buffer size is buffer_default. The difference between the audio and the video in the reception flow is observed, this is the delta_audio_video.

This provides the targeted video buffer, which is the buffer_real:

$$buffer\_real = max(buffer\_default, delta\_audio\_video \times bit\_rate)$$

The virtual video PTS is continuously calculated:

$$virtual\_video\_PTS = current\_video\_PTS - (buffer\_real - current\_buffer\_level)/bit\_rate$$

As soon as the real audio PTS reaches the virtual_video_PTS, the audio is rendered at standard speed. The audio buffer size is set to the value of the audio buffer filling level at that moment.

The embodiments as indicated hereinabove preferably fit to small buffers, wherein a small buffer corresponds to a maximum of five seconds.

When the buffer is much larger, the zapping method comprises another phase, between phase 2 and phase 3, where the content is rendered at a speed close to the standard speed for a long duration. The nominal level is reached linearly. During the phase 3, the receiver usually sets up corrective mechanisms to support transport jitter variations, wherein the nominal buffer filling level is continuously updated. Corrective mechanisms are also set up during this phase, wherein the virtual buffer level which is the ideal line of progressive buffer fill is continuously updated.

For example for a 30 seconds buffer, the phase 2 ends at a buffer filling level of 2 seconds. Then during the new phase the video is rendered at a speed set to 95% of the standard speed.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. Method at a receiver for early playing a stream, said stream comprising a set of video samples and a set of audio samples, said audio samples and said video samples being adapted to be rendered at a standard rendering speed in a synchronized manner, comprising at the receiver the steps of:
    starting the reception of said stream;
    starting the rendering of said video samples at a speed slower than the standard rendering speed and not synchronized with the audio samples rendered at the standard rendering speed;
    accelerating the rendering speed of said video samples up to the standard rendering speed; and
    rendering the video samples at the standard rendering speed and synchronized with the audio samples rendered at the standard rendering speed.

2. Method according to claim 1, wherein the step of rendering the audio samples at the standard rendering speed and synchronized with the video samples starts with the video sample rendering being adjusted to the audio sample rendering.

3. Method according to claim 1, wherein the step of rendering the audio samples at the standard rendering speed and not synchronized with the video samples starts at a time corresponding to the time when the video sample is rendered at the standard rendering speed.

4. Method at a receiver for early playing a stream, said stream comprising a set of video samples and a set of audio samples, said audio samples and said video samples being adapted to be rendered at a standard rendering speed in a synchronized manner, comprising at the receiver the steps of
    starting the reception of said stream;
    buffering said stream in a memory;
    starting the rendering of said video samples at a speed slower than the standard rendering speed;
    once the audio samples buffer level reaches a threshold, starting the rendering said audio samples, synchronized with the video samples, at a speed lower than the standard speed;
    accelerating the rendering speed of said video samples and audio samples up to the standard rendering speed; and
    rendering the video samples at the standard rendering speed and synchronized with the audio samples rendered at the standard rendering speed.

5. Method according to claim 1, wherein it prior to the step of receiving a stream, it comprises the step of zapping to a new program.

6. Method according to claim 1, wherein the stream is an MPEG-2 stream.

7. Method according to claim 1, wherein the time for rendering video samples depends on the delay between the reception of audio and video samples.

* * * * *